United States Patent
Yoon

(10) Patent No.: US 12,487,683 B2
(45) Date of Patent: Dec. 2, 2025

(54) DISPLAY APPARATUS AND CONTROLLING METHOD THEREOF

(71) Applicant: SAMSUNG ELECTRONICS CO., LTD., Suwon-si (KR)

(72) Inventor: Daewon Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/003,604

(22) Filed: Dec. 27, 2024

(65) Prior Publication Data
US 2025/0224807 A1    Jul. 10, 2025

Related U.S. Application Data

(63) Continuation of application No. PCT/KR2024/017400, filed on Nov. 6, 2024.

(30) Foreign Application Priority Data

Jan. 5, 2024 (KR) .................. 10-2024-0002300
Apr. 17, 2024 (KR) .................. 10-2024-0051121

(51) Int. Cl.
*G06F 3/01* (2006.01)
*H04N 13/302* (2018.01)
(Continued)

(52) U.S. Cl.
CPC ........... *G06F 3/017* (2013.01); *H04N 13/302* (2018.05); *H04N 13/383* (2018.05)

(58) Field of Classification Search
CPC . G06F 3/017; G06F 3/011; G06F 3/01; H04N 13/30; H04N 13/302; H04N 13/38
(Continued)

(56) References Cited

U.S. PATENT DOCUMENTS 7,857,708 B2    12/2010    Ueda et al.
9,250,707 B2    2/2016    Choi et al.
(Continued)

FOREIGN PATENT DOCUMENTS

CN         115236871 A        10/2022
JP        2005 270508 A       10/2005
(Continued)

OTHER PUBLICATIONS

Communication dated Feb. 13, 2025, issued by the International Searching Authority in International Application No. PCT/KR2024/017400 (PCT/ISA/210 and PCT/ISA/237).

*Primary Examiner* — Daquan Zhao
(74) *Attorney, Agent, or Firm* — Sughrue Mion, PLLC

(57) ABSTRACT

A display apparatus, includes: a display; a communication interface; a camera; a processor; and memory storing instructions that, when executed by the processor, cause the display apparatus to: display a motion guide including a pre-set pose through the display; identify a position of a head of a user based on an image obtained through the camera; identify a first distance from the display apparatus to the position of the head; identify a pre-set point of a spine based on a pre-set second distance in a downward direction from the position of the head; identify a first position of both hands of the user corresponding to the pre-set pose based on distance information from at least one from among a plurality of motion controllers gripped by both of the hands through the communication interface; and display representations of both of the hands based on the first position.

20 Claims, 11 Drawing Sheets

(51) Int. Cl.
*H04N 13/383* (2018.01)
*H04N 13/30* (2018.01)
*H04N 13/38* (2018.01)

(58) Field of Classification Search
USPC .......................... 348/135, 136, 140, 61, 169
See application file for complete search history.

(56) References Cited

U.S. PATENT DOCUMENTS

| | | | |
|---|---|---|---|
| 9,513,711 B2* | 12/2016 | Ryu | G06F 3/017 |
| 10,168,767 B2* | 1/2019 | Chew | G06F 3/167 |
| 10,460,512 B2* | 10/2019 | Chen | G06V 10/40 |
| 2011/0289455 A1* | 11/2011 | Reville | G06F 3/011 |
| | | | 715/830 |
| 2018/0232046 A1 | 8/2018 | Han et al. | |

FOREIGN PATENT DOCUMENTS

| | | |
|---|---|---|
| JP | 2013-257830 A | 12/2013 |
| KR | 10 2014 0039641 A | 4/2014 |
| KR | 10-1795574 B1 | 11/2017 |
| KR | 10-1892093 B1 | 8/2018 |
| KR | 10 2019 0050775 A | 5/2019 |
| KR | 10 2023 0113023 A | 7/2023 |

* cited by examiner

DISPLAY APPARATUS AND CONTROLLING METHOD THEREOF

CROSS-REFERENCE TO RELATED APPLICATIONS

This application is a by-pass continuation application of International Application No. PCT/KR2024/017400, filed on Nov. 6, 2024, which is based on and claims priority to Korean Patent Application No. 10-2024-0002300, filed in the Korean Intellectual Property Office on Jan. 5, 2024, and Korean Patent Application No. 10-2024-0051121, filed in the Korean Intellectual Property Office on Apr. 17, 2024, the disclosures of which are incorporated by reference herein in their entireties.

FIELD

The disclosure relates to a display apparatus and a controlling method thereof, and more particularly to a display apparatus displaying a 3D stereoscopic image and a controlling method thereof.

DESCRIPTION OF RELATED ART

Various types of electronic devices are being developed and distributed with the development of electronic technology. Display apparatuses which are used in various locations such as homes, offices, public locations, and the like have continuously been under development for several years.

Stereoscopy may mean a 3-dimensional (3D) technology. 3D displays may employ a method using binocular parallax. A binocular parallax method may form a 3D effect on a single screen such as a TV or a theater screen. The method using binocular parallax may be divided into a glasses type method (steroscopic) which uses auxiliary devices such as glasses and a non-glasses type method (auto-stereoscopic).

Recently, commercialization for light field displays in the non-glasses type method and a non-glasses type 3D display utilizing eye-tracking are continuously being researched.

SUMMARY

According to an aspect of the disclosure, a display apparatus, includes: a display; a communication interface; at least one camera; one or more processors; and memory storing instructions that, when executed by the one or more processors, cause the display apparatus to: display a motion guide including a pre-set pose through the display; identify a position of a head of a user based on an image obtained through the at least one camera; identify a first distance from the display apparatus to the position of the head; identify a pre-set point of a spine based on a pre-set second distance in a downward direction from the position of the head; identify a first position of both hands of the user corresponding to the pre-set pose based on distance information from at least one from among a plurality of motion controllers gripped by both of the hands through the communication interface; and display, through the display, representations of both of the hands based on the first position.

The one or more processors may be configured to execute the instructions to cause the display apparatus to: identify, based on motion information of both of the hands being received from the plurality of motion controllers, a second position of both of the hands based on the motion information; and display, through the display, the representations of both of the hands based on the second position of both of the hands.

The motion information may include a moving direction and a moving distance of both of the hands, and the one or more processors may be configured to execute the instructions to cause the display apparatus to identify the second position of both of the hands based on the moving direction and the moving distance of both of the hands.

The one or more processors may be configured to execute the instructions to cause the display apparatus to: identify a first virtual space based on the position of the head, the first position of both of the hands, and a position of the display apparatus; identify first coordinates corresponding to the position of the head and second coordinates corresponding to the first position of both of the hands based on the position of the display apparatus as a reference point in the first virtual space; and display the representations of both of the hands by mapping the head and both of the hands in a content space displayed in the display based on the first coordinates and the second coordinates.

The content space may be a second virtual space corresponding to a virtual reality (VR) content image, and the one or more processors may be configured to execute the instructions to cause the display apparatus to: identify, based on third coordinates corresponding to a second position of both of the hands in the first virtual space being identified, fourth coordinates in the second virtual space based on the third coordinates; and display the representations of both of the hands by mapping both of the hands in the content space based on the fourth coordinates.

The one or more processors may be configured to execute the instructions to cause the display apparatus to: identify a position of both eyes of the user based on a first captured image obtained through a depth camera or identify the position of both of the eyes based on a second captured image and a third captured image obtained through a stereo camera; and identify the position of the head based on a center position of both of the eyes.

The pre-set pose may be a pose in which both of the hands are positioned at a horizontal line including the pre-set point of the spine and face a front side of the display, and a first linear distance between the pre-set point and the head may be perpendicular to a second linear distance between the pre-set point and the display.

The display may be a light field display (LFD) providing a 3D image.

The one or more processors may be configured to execute the instructions to cause the display apparatus to adjust sizes of the representations of both of the hands by adjusting the pre-set second distance.

The one or more processors may be configured to execute the instructions to cause the display apparatus to adjust a size of the representations of both of the hands based on a VR content type.

According to an aspect of the disclosure, a controlling method of a display apparatus, includes: displaying a motion guide including a pre-set pose; identifying a position of a head of a user based on a captured image of the user; identifying a first distance from the display apparatus to the position of the head; identifying a pre-set point of a spine based on a pre-set second distance in a downward direction from the position of the head; identifying a first position of both hands of the user corresponding to the pre-set pose based on distance information from at least one from among a plurality of motion controllers gripped by both of the hands; and displaying representations of both of the hands based on the first position of both hands of the user.

The controlling method may further include: identifying, based on motion information of both of the hands being received from the plurality of motion controllers, a second position of both of the hands based on the motion information; and displaying the representations of both of the hands based on the second position of both of the hands.

The motion information may include a moving direction and a moving distance of both of the hands, and the identifying the second position may include identifying the second position of both of the hands based on the moving direction and the moving distance of both of the hands.

The displaying the representations of both of the hands may include: identifying a first virtual space based on the position of the head, the first position of both of the hands, and a position of the display apparatus; identifying first coordinates corresponding to the position of the head and second coordinates corresponding to the first position of both of the hands based on the position of the display apparatus as a reference point in the first virtual space; and displaying the representations of both of the hands by mapping the head and both hands in a content space based on the first coordinates and the second coordinates.

The content space may be a second virtual space corresponding to a virtual reality (VR) content image, and the displaying the representations of both of the hands, may further include: identifying, based on third coordinates corresponding to a second position of both of the hands in the first virtual space being identified, fourth coordinates in the second virtual space based on the third coordinates; and displaying the representations of both of the hands by mapping both of the hands in the content space based on the fourth coordinates.

The identifying the position of the head may include: identifying a position of both eyes of the user based on a first captured image obtained through a depth camera or identifying the position of both of the eyes based on a second captured image and a third captured image obtained through a stereo camera; and identifying the position of the head based on a center position of both of the eyes The pre-set pose may be a pose in which both of the hands are positioned at a horizontal line including the pre-set point of the spine and face a front side of the display, and a first linear distance between the pre-set point and the head may be perpendicular to a second linear distance between the pre-set point and the display.

The representations of both of the hands may be displayed via a light field display (LFD) providing a 3D image.

The controlling method may further include adjusting sizes of the representations of both of the hands by adjusting the pre-set second distance.

According to an aspect of the disclosure, a non-transitory computer-readable storage medium storing computer instructions for a display apparatus to perform an operation when executed by a processor of the display apparatus, the operation includes: displaying a motion guide including a pre-set pose; identifying a position of a head of a user based on a captured image of the user; identifying a first distance from the display apparatus to the position of the head; identifying a pre-set point of a spine based on a pre-set second distance in a downward direction from the position of the head; identifying a first position of both hands of the user corresponding to the pre-set pose based on distance information from at least one from among a plurality of motion controllers gripped by both of the hands; and displaying representations of both of the hands based on the first position.

BRIEF DESCRIPTION OF THE DRAWINGS

The above and other aspects, features, and advantages of certain embodiments of the present disclosure are more apparent from the following description taken in conjunction with the accompanying drawings, in which.

DETAILED DESCRIPTION

Figure 1:
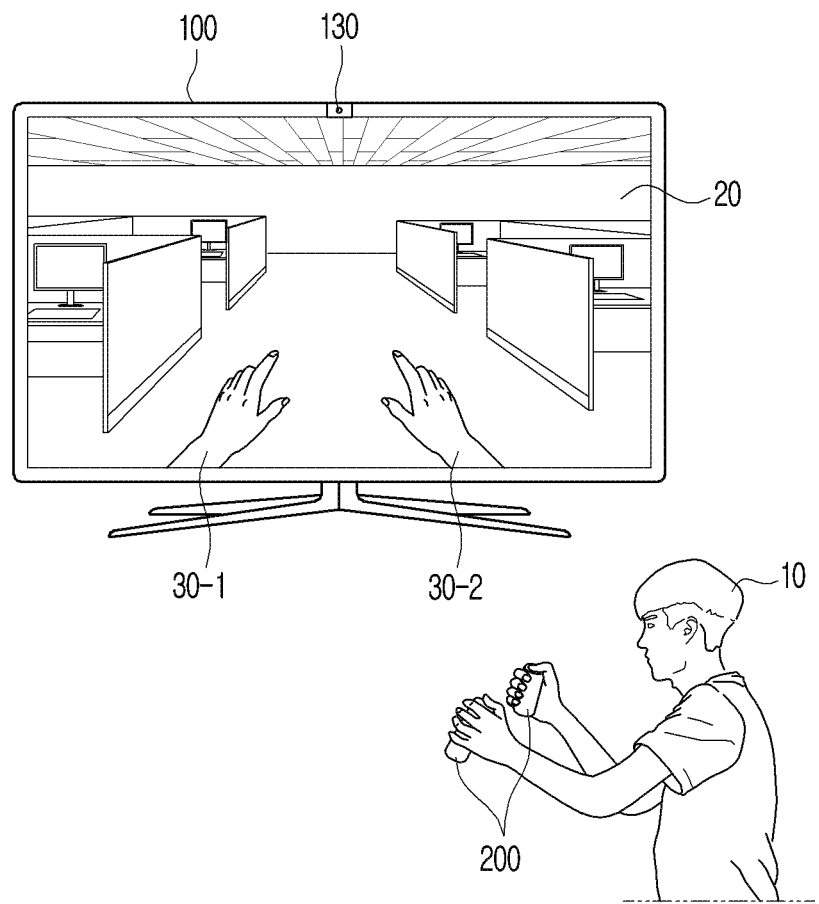
FIG. 1 is a diagram illustrating an operation of a display apparatus according to one or more embodiments.

The embodiments described in the disclosure, and the configurations shown in the drawings, are only examples of embodiments, and various modifications may be made without departing from the scope and spirit of the disclosure.

Terms used in describing various embodiments of the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected, and in this case, the meaning of the term will be disclosed in greater detail in the relevant description. Accordingly, the terms used herein are not to be understood simply as its designation but based on the meaning of the term and the overall context of the disclosure.

In the disclosure, expressions such as "have," "may have," "include," and "may include" are used to designate a presence of a relevant characteristic (e.g., elements such as numerical value, function, operation, or component), and not to preclude a presence or a possibility of additional characteristics.

The expression at least one of A and/or B is to be understood as indicating any one of "A" or "B" or "A and B."

Expressions such as "1st", "2nd", "first" or "second" used in the disclosure may limit various elements regardless of order and/or importance, and may be used merely to distinguish one element from another element and not limit the relevant element.

When a certain element (e.g., a first element) is indicated as being "(operatively or communicatively) coupled with/ to" or "connected to" another element (e.g., a second element), it may be understood as the certain element being directly coupled with/to the another element or as being coupled through other element (e.g., a third element).

A singular expression includes a plural expression, unless otherwise specified. In the disclosure, it is to be understood that the terms such as "form" or "include" are used to designate a presence of a characteristic, number, step, operation, element, component, or a combination thereof, and not to preclude a presence or a possibility of adding one or more of other characteristics, numbers, steps, operations, elements, components or a combination thereof.

The term "module" or "part" used in the disclosure perform at least one function or operation, and may be implemented with hardware or software, or implemented with a combination of hardware and software. In addition, a plurality of "modules" or a plurality of "parts," except for a "module" or a "part" which are to be implemented for hardware, may be integrated in at least one module.

In the disclosure, the term "user" may refer to a person using an electronic apparatus or an apparatus used by the person.

One or more embodiments will be described in greater detail below with reference to the accompanied drawings.

FIG. 1 is a diagram illustrating an operation of a display apparatus according to one or more embodiments.

A display apparatus 100 may be implemented in display apparatuses of various types such as, for example, and without limitation, a television (TV), a monitor, a kiosk, a tablet personal computer (PC), an electronic frame, a mobile phone, a large format display (LFD), digital signage, a digital information display (DID), a video wall, a projector display, and the like. However, the display apparatus 100 may be implemented as image processing apparatuses (e.g., a set-top box, a one connected box) providing images by being connected with the display apparatus according to circumstance.

The display apparatus 100 may display a 3D stereoscopic image for a user 10 experiencing a non-glasses type virtual reality (VR). The display apparatus 100 may capture the user 10 through a camera 130, and display a VR content image 20 corresponding to the captured image. The VR content image 20 displayed by the display apparatus 100 may include a content image for the user to experience and a GUI corresponding to a motion of the user. For example, the GUI corresponding to the motion of the user may include an image of both hands (or one hand) 30-1 and 30-2. The display apparatus 100 may obtain motion information corresponding to both hands of the user by performing communication with a plurality of motion controllers 200 gripped by both hands of the user, and display the image of both hands 30-1 and 30-2 of the user based on the obtained motion information.

The non-glasses type VR may mean technology with which the user may experience virtual reality (VR) through a displayed content without having to wear glasses. For example, VR devices may employ head-mounted display (HMD) methods of mounting a VR device on a head of a user, but the non-glasses type VR may mean technology with which virtual reality (VR) may be experienced through the displayed content even when a user is not wearing glasses, or not wearing a device on the head.

A motion controller 200 may be an electronic apparatus for detecting movement of the user, and may be implemented into forms wearable on a portion of a body of the user. For example, the motion controller 200 may be implemented in a form grippable by a hand of the user. However, the disclosure is not limited thereto, and the motion controller 200 may be implemented in a form wearable on a wrist or at least a portion of fingers of the user.

In an example, the motion controller 200 may generate motion information by sensing, in real-time, a movement of the user through various sensors such as, for example, and without limitation, an acceleration sensor, a gyro sensor, a magnetic sensor, an optical sensor, and the like. For example, the motion information may include at least one from among moving distance information, moving direction information, or moving speed information. The motion information is not limited thereto, and may be variously referred to as movement information, operation information, action information, and the like, but in the disclosure, will be collectively referred to as motion information.

In an example, the motion controller 200 may identify coordinate values in virtual space according to a motion of the user. For example, the motion controller 200 may identify (x, y, z) values in virtual space through sensor values of the acceleration sensor and the gyro sensor with respect to a random reference coordinate point. The motion controller 200 may identify coordinate values in virtual space through data measured from a plurality of sensors based on a pre-set axis of a sensor. Accordingly, the motion controller 200 may sense a movement of the user with respect to the virtual space using coordinate values as the reference coordinates. The motion controller 200 is not limited thereto, and may be variously referred to as a movement detector, an operation interface, a motion tracker, an operation reader, and the like, but in the disclosure, will be collectively referred to as the motion controller.

The VR content image 20 displayed by the display apparatus 100 may be a 3D stereoscopic image. The display apparatus 100 may be a LFD display apparatus for displaying a 3D image. The LFD display apparatus may mean a display apparatus that generates a stereoscopic 3D image according to a gaze, a position, and depth of the user. The LFD display apparatus may be a 3D display that expresses different images according to a direction at which the user is viewing unlike a 2D display that expresses the same image from whichever angle the user is viewing. The LFD display apparatus may display the 3D stereoscopic image by generating a light field which is expressed as a vector of light in a space by a planar display and optical devices The light field may refer to a concept of a field of light that expresses a 5-dimensional vector function including a traveling direction and intensity of light from all points in a 3D space. The light field may be implemented in various methods such as, for example, and without limitation, a method of using diffraction grating, a method of adjusting direction and intensity of light through a plurality of pixels, a method of using a pinhole or a micro lens array, and the like. In an example, the method of using a micro lens array be a method with which the light field may be implemented due to light emitted from each pixel from a micro lens allocated with a series of display pixels traveling in only a direction by a lens. Accordingly, the LFD display apparatus may display a 3D image with a 3D effect to the user by implementing the light field.

According to one or more embodiments, the display apparatus 100 may perform communication with the plurality of motion controllers 200 gripped by the hands of the user 10. The display apparatus 100 may display the image of both hands 30-1 and 30-2 of the user corresponding to a movement of the user together with the VR content image 20 based on information received from the motion controller 200.

Referring to FIG. 1, the display apparatus 100 may display a 3D stereoscopic image including the VR content image 20 and the image of both hands 30-1 and 30-2 of the user. The display apparatus 100 may identify a position of the user in the 3D space in which the user is positioned based on a captured image obtained through at least one camera 130 positioned at an upper end thereof. For example, the display apparatus 100 may identify the position of the head and the position of both hands of the user in the 3D space based on the captured image obtained through the at least one camera 130. According to one or more embodiments, the head and both hands of the user always form a triangle and a spine of the user may be present at a bottom side thereof. Accordingly, the position and/or size of the head and both hands of the user may be reproduced in virtual space provided in the display apparatus 100 with only relative coordinates. Accordingly, various embodiments in which the movement of both hands of the user can be used as an input controller in a VR content provided in the display apparatus 100 based on information received from the motion controller 200 will be described below.

Figure 2:
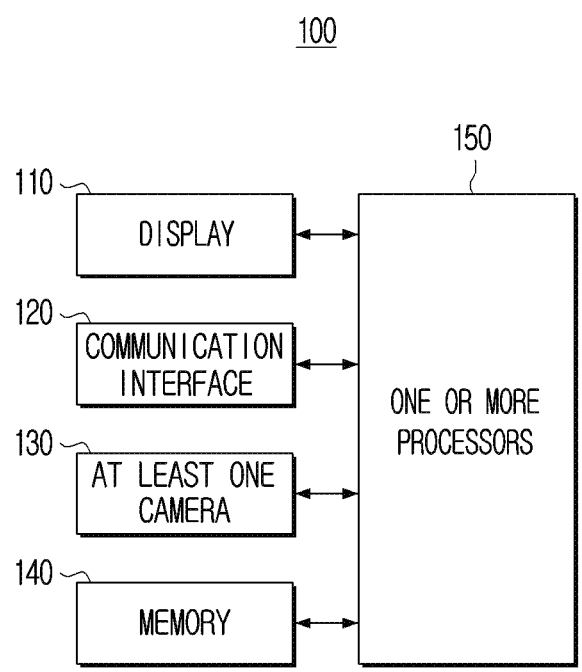
FIG. 2 is a block diagram illustrating a configuration of a display apparatus according to one or more embodiments.

FIG. 2 is a block diagram illustrating a configuration of a display apparatus according to one or more embodiments.

Referring to FIG. 2, the display apparatus 100 may include a display 110, a communication interface 120, at least one camera 130, a memory 140, and one or more processors 150. However, the above is not limited thereto, and the display apparatus 100 may be implemented in a form in which a portion of the configurations are excluded, or implemented in a form in which other configurations are further included.

The display 110 may be a configuration for providing the user with a VR content and a 3D stereoscopic image of both hands of the user. The display 110 may be implemented as a display including self-emissive devices or a display including non-emissive devices and a backlight. In addition, the display 110 may be implemented as the LFD display according to the above-described description. For example, the display 110 may be implemented in displays of various forms such as, for example, and without limitation, a liquid crystal display (LCD), an organic light emitting diode (OLED) display, light emitting diodes (LED), a micro LED, a mini LED, a plasma display panel (PDP), a quantum dot (QD) display, a quantum dot light emitting diodes (QLED), or the like. In the display 110, a driving circuit, which may be implemented in a form of an a-si TFT, a low temperature poly silicon (LTPS) TFT, an organic TFT (OTFT), or the like, a backlight unit, and the like may be included together therewith.

According to an example, the one or more processors 150 may provide the 3D stereoscopic image for the image of both hands of the user corresponding to the position of the motion controller 200 through the display 110.

According to an example, the one or more processors 150 may provide, through the display 110, the 3D stereoscopic image for the image of both hands of the user corresponding to the position of the motion controller 200 based on the changed motion information of the user.

The communication interface 120 may include circuitry, and perform communication with the motion controller (a server or a user terminal). For example, the one or more processors 150 may receive various data or information from the motion controller 200 connected through the communication interface 120, and transmit the various data or information to the motion controller 200.

The communication interface 120 may include at least one from among a Wi-Fi module, a Bluetooth module, a wireless communication module, a NFC module, and an ultra wide band (UWB) module. At this time, the wireless communication module may perform communication according to various communication standards such as, for example, and without limitation, IEEE, ZigBee, 3rd Generation (3G), 3rd Generation Partnership Project (3GPP), Long Term Evolution (LTE), 5th Generation (5G), and the like.

According to an example, the one or more processors 150 may receive motion information from the motion controller 200 through the communication interface 120.

The at least one camera 130 may be an apparatus for generating a 3D stereoscopic image or capturing the user. The at least one camera may be implemented as cameras of various forms such as, for example, and without limitation, a plenoptic camera, an array camera, a stereo camera, a depth camera, an AI camera, an infrared camera, a motion camera, and the like. The plenoptic camera may implement one image into an image of various viewpoints using a lens array and generate an image in 3D form including direction and depth information of light. The array camera may include a plurality of lenses and capture an image from different viewpoints from one another, and generate an image in 3D form including spatial information by combining the plurality of captured images.

According to an example, one or more cameras 130 may be disposed at a position at which a front direction of the display 110 can be captured. For example, the one or more cameras 130 may be disposed at a center area of an upper end bezel of the display 110.

According to an example, the one or more cameras 130 may be disposed at a direction and angle at which the front direction of the display 110 can be captured. According to an example, the camera 130 may be disposed at a direction and angle which can be recognized as facing a front side of the display 110 based on the gaze of the user facing the front side in the captured image. The stereo camera may capture two images through two lenses, and obtain distance information in 3D space utilizing a distance between the lenses. The stereo camera may respectively receive object images in a space which is spaced apart by a distance from the two lenses, and obtain distance information on an object in the space based on disparity of images input from each lens, a focal distance (a distance between an image plane and a lens), and a base line (a distance between the lenses). The stereo camera may obtain disparity information through a process of matching two object images obtained from two lenses with respect to coordinates of a position, and obtain distance information on the object in the space based on a pre-set focal distance and baseline.

The depth camera may receive returning rays after a laser or infrared rays are projected to an external object in the stereo camera, and obtain depth data by stereoscopically measuring a distance with the external object. The AI camera may identify a face of the user and detect movement based on an artificial intelligence model.

According to an example, the one or more processors 150 may identify a distance from a position of the head of the user to the display apparatus 100 through the stereo camera.

The memory 140 may store at least one instruction, data, program, and the like in an operation of the display apparatus 100. In an example, the memory 140 may store information on a motion guide including a pre-set pose. In an example, the memory 140 may store information for identifying a moving space of a user, for example, a second distance which is a distance from the position of the head of the user to a pre-set point of the spine.

The memory 140 may be implemented in a form of a memory embedded in the display apparatus 100 according to a data storage use, or implemented in a form of a memory attachable to or detachable from the display apparatus 100. In an example, data for driving of the display apparatus 100 may be stored in the memory embedded in the display apparatus 100, and data for an expansion function of the display apparatus 100 may be stored in the memory attachable to or detachable from the display apparatus 100.

The memory embedded in the display apparatus 100 may be implemented as at least one from among a volatile memory (e.g., a dynamic RAM (DRAM), a static RAM (SRAM), or a synchronous dynamic RAM (SDRAM)), or a non-volatile memory (e.g., one time programmable ROM (OTPROM), programmable ROM (PROM), erasable and programmable ROM (EPROM), electrically erasable and programmable ROM (EEPROM), mask ROM, flash ROM, a flash memory (e.g., NAND flash or NOR flash), a hard disk drive (HDD) or a solid state drive (SSD)).

The memory 140 may be implemented as a single memory configured to store data generated from various operations according to the disclosure, but is not limited thereto, and the memory 140 may be implemented to include a plurality of memories configured to respectively store data of different types, or respectively store data generated at different operations.

The one or more processors 150 may control an overall operation of the display apparatus 100. The one or more processors 150 may control the overall operation of the display apparatus 100 by being connected with each configuration of the display apparatus 100. For example, the one or more processors 150 may control the overall operation of the display apparatus 100 by being electrically connected with the display 110 and the memory 140. The one or more processors 150 may be configured with one or a plurality of processors.

The one or more processors 150 may perform an operation of the display apparatus 100 according to various embodiments by executing one or more instructions stored in the memory 140.

The one or more processors 150 may include one or more from among a central processing unit (CPU), a graphics processing unit (GPU), an accelerated processing unit (APU), a many integrated core (MIC), a digital signal processor (DSP), a neural processing unit (NPU), a hardware accelerator, or a machine learning accelerator. The one or more processors 150 may control one or a random combination from among other elements of a display device, and perform an operation associated with communication or data processing. The one or more processors 150 may execute one or more programs or instructions stored in the memory. For example, the one or more processors 150 may perform, by executing one or more instructions stored in the memory, a method according to one or more embodiments.

When a method according to one or more embodiments includes a plurality of operations, the plurality of operations may be performed by one processor, or performed by a plurality of processors. For example, when a first operation, a second operation, and a third operation are performed by a method according to one or more embodiments, the first operation, the second operation, and the third operation may all be performed by a first processor, or the first operation and the second operation may be performed by the first processor (e.g., a generic-purpose processor) and the third operation may be performed by a second processor (e.g., an artificial intelligence dedicated processor).

The one or more processors 150 may be implemented as a single core processor that includes one core, or implemented as one or more multicore processors that include a plurality of cores (e.g., a homogeneous multicore or a heterogeneous multicore). If the one or more processors 150 are implemented as a multicore processor, each of the plurality of cores included in the multicore processor may include a memory inside the processor such as a cache memory and an on-chip memory, and a common cache shared by the plurality of cores may be included in the multicore processor. In addition, each of the plurality of cores (or a portion from among the plurality of cores) included in the multicore processor may independently read and perform a program command for implementing a method according to one or more embodiments, or read and perform a program command for implementing a method according to one or more embodiments due to a whole (or a portion) of the plurality of cores being interconnected.

When a method according to one or more embodiments includes a plurality of operations, the plurality of operations may be performed by one core from among the plurality of cores or performed by the plurality of cores included in the multicore processor. For example, when a first operation, a second operation, and a third operation are performed by a method according to one or more embodiments, the first operation, the second operation, and the third operation may all be performed by a first core included in the multicore processor, or the first operation and the second operation may be performed by the first core included in the multicore processor and the third operation may be performed by a second core included in the multicore processor.

In one or more embodiments, a processor may refer to a system on chip (SoC), a single core processor, or a multicore processor in which one or more processors and other electronic components are integrated or a core included in the single core processor or the multicore processor, and the core herein may be implemented as the CPU, the GPU, the APU, the MIC, the DSP, the NPU, the hardware accelerator, the machine learning accelerator, or the like, but is not limited to one or more embodiments. However, the one or more processors 150 may be designated as a processor 150 for convenience of description below.

According to one or more embodiments, the processor 150 may display the motion guide including the pre-set pose through the display 110. The motion guide may refer to a guide that guides an operation or movement to calculate absolute coordinates based on coordinate values of the head and both hands. In an example, the motion guide may be a guide for calculating the absolute coordinates for the positions of the head and both hands of the user to be positioned at each corner of a pre-set triangle. For example, the motion guide may be a guide that includes an operation of the gaze of the user facing a front side of the display apparatus 100, and raising both hands. The motion guide is not limited thereto, and may be variously referred to as a guidance guide, a movement guide, a gesture guide, and the like, but will be collectively referred to as the motion guide in the disclosure. Detailed descriptions regarding the motion guide will be described below in FIG. 3.

According to one or more embodiments, the processor 150 may identify the position of the head of the user based on an image obtained through the at least one camera 130. Here, the position of head may include a position of glabella between the eyes of the user. According to an example, the processor 150 may identify the position of the head of the user based on eye tracking which detects, in real-time, pupil movements of the user through the at least one camera 130. According to an example, the processor 150 may identify a face in a closed curved form including eyes, nose, and mouth of the user through the AI camera, and identify the position of the head based on the identified face.

According to one or more embodiments, the processor 150 may identify the pre-set point of the spine based on a pre-set second distance in a downward direction from the position of the head. The pre-set point of the spine may refer to a point at which a line of the spine extending in a downward direction from a neck of a person (hereinafter, a first line) and a horizontal line including shoulders on both sides of the user (hereinafter, a second line) meets. Meanwhile, both hands of the user may be positioned at end points at both sides of the second line. At this time, the first line and the second line may meet perpendicular to each other, and an intersection point at which the first line and the second line meet perpendicularly may be the pre-set point of the spine.

The second distance may refer to a distance from the position of the head of the user to the pre-set point of the spine. The second distance may be a pre-set value stored in the memory 140. For example, the second distance may be 12 cm which is an average length of a neck of a person, and a value of the second distance may be changed according to a user input.

According to one or more embodiments, the processor 150 may identify the position of both hands of the user (hereinafter, the first position) corresponding to the pre-set pose based on distance information received from at least one from among the plurality of motion controllers gripped by both hands of the user through the communication interface 120. Here, the distance information may include a third distance between the plurality of motion controllers 200. The pre-set pose may include a pose facing the front side of the display 110 while both hands of the user are positioned at the horizontal line including the pre-set point of the spine. According to an example, the processor 150 may identify the first position of both hands of the user based on a distance value corresponding to ½ of the third distance.

According to one or more embodiments, the processor 150 may display representations of both hands of the user based on the first position of both hands of the user through the display 110.

Figure 3:
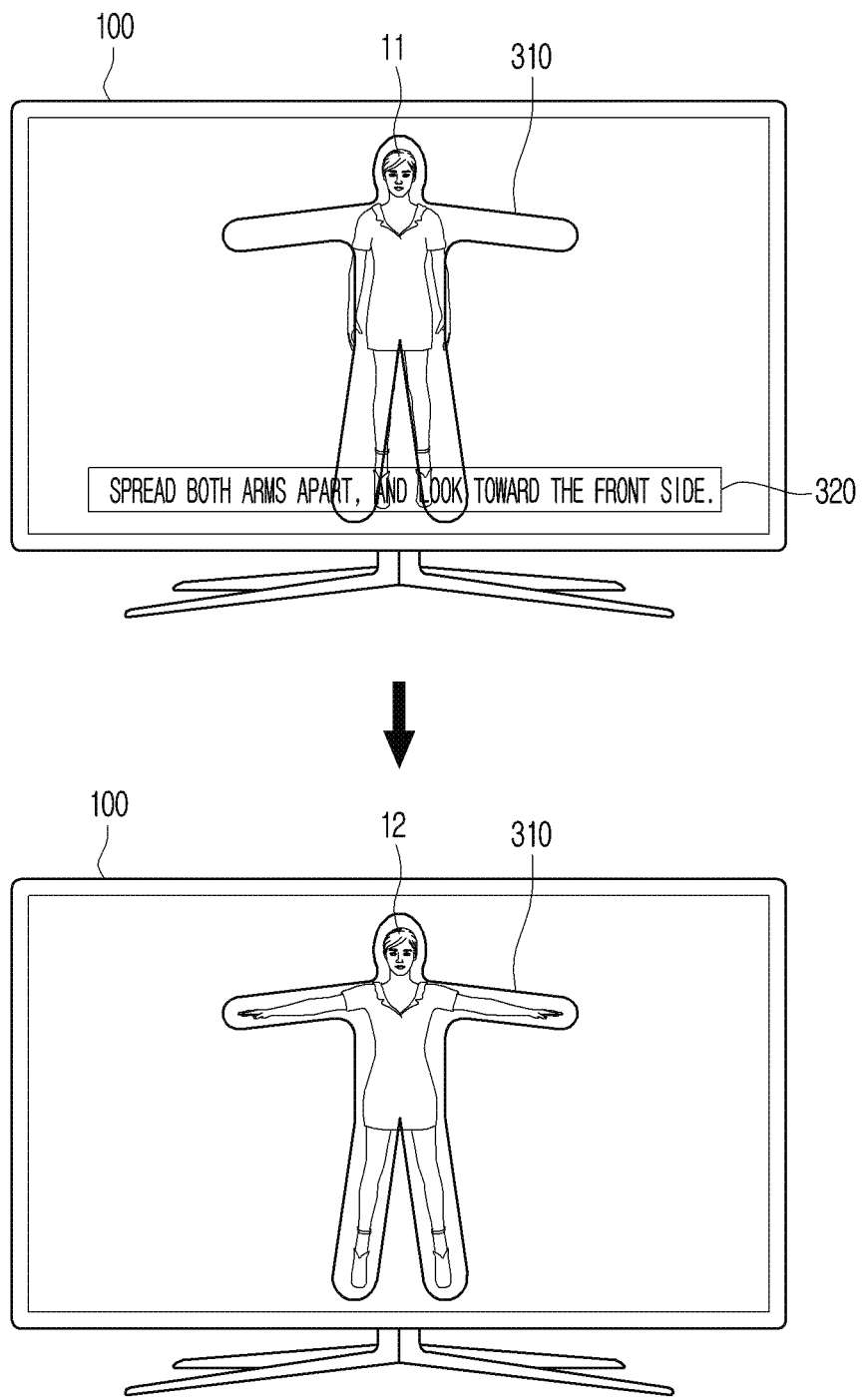
FIG. 3 is a diagram illustrating a process of providing a motion guide of a display apparatus according to one or more embodiments.

FIG. 3 is a diagram illustrating a process of providing a motion guide of a display apparatus according to one or more embodiments.

According to one or more embodiments, the display apparatus 100 may provide a motion guide to the user to generate absolute coordinates including the positions of the head and both hands of the user. The display apparatus 100 may display motion guides 310 and 320 including the pre-set pose and/or a pre-set text through the display 110. The display apparatus 100 may provide the motion guides 310 and 320 for initializing for the generation of absolute coordinates including coordinates of the head and both hands of the user. Here, initializing may refer to an initial setting process for setting absolute coordinates which become a reference point for identifying the position of the motion controller 200.

Referring to FIG. 3, the display apparatus 100 may display a pre-set pose image 310 in a 2-dimensional closed curve form and a pre-set text 320 such as "spread both arms apart, and look toward the front side" through the display 110. However, the pre-set pose image may not necessarily be provided in the closed curved form, and may be provided in various forms that can guide the pose of the user such as a 3D closed curve, a 2D/3D open curve, a straight line, and the like.

According to an example, the display apparatus 100 may capture a user 11 gripping the motion controllers 200 in both hands facing a display screen using the camera 130. The display apparatus 100 may overlap, based on obtaining an image with the captured user, the image with the captured user and the pre-set pose image 310 and display in the display 110. The display apparatus 100 may display the pre-set text 320 at a lower end of the display 110. However, the image with the captured user and the pre-set pose image 310 may not necessarily be overlapped and displayed, and displayed at different screen areas. For example, the image with the captured user and the pre-set pose image 310 may be displayed in a row in a perpendicular or horizontal direction.

Meanwhile, as shown in FIG. 3, the pre-set pose is not limited thereto, and may include a pose of having raised both arms to a shoulder height. The pre-set text is not limited to the above and may include texts corresponding to the pre-set pose such as, for example, and without limitation, "please raise both hands up to shoulder height", "please gaze at the screen and raise your hand", and the like. In addition, a position of the pre-set text has been displayed at the lower end, but is not limited thereto, and may be displayed in any position such as, an upper end, a left side, a right side or the like.

According to an example, the pre-set pose image 310 and the text 320 may not necessarily be provided together, any one from among the pre-set pose image 310 and the text 320 may be provided only.

According to an example, the display apparatus 100 may display, if a user 12 who changed to a posture corresponding to the pre-set pose 310 is identified based on a captured image obtained through the camera 130, a notification or message notifying that an initial setting is completed through at least one from among the display 110 or a speaker. For example, if the user 12 is identified as having changed posture to correspond to a size of the pre-set pose by raising both hands to shoulder height for both hands to correspond to the pre-set pose, or adjusting a distance with the display apparatus, a notification or message notifying that an initial setting is completed may be displayed.

Figure 4:
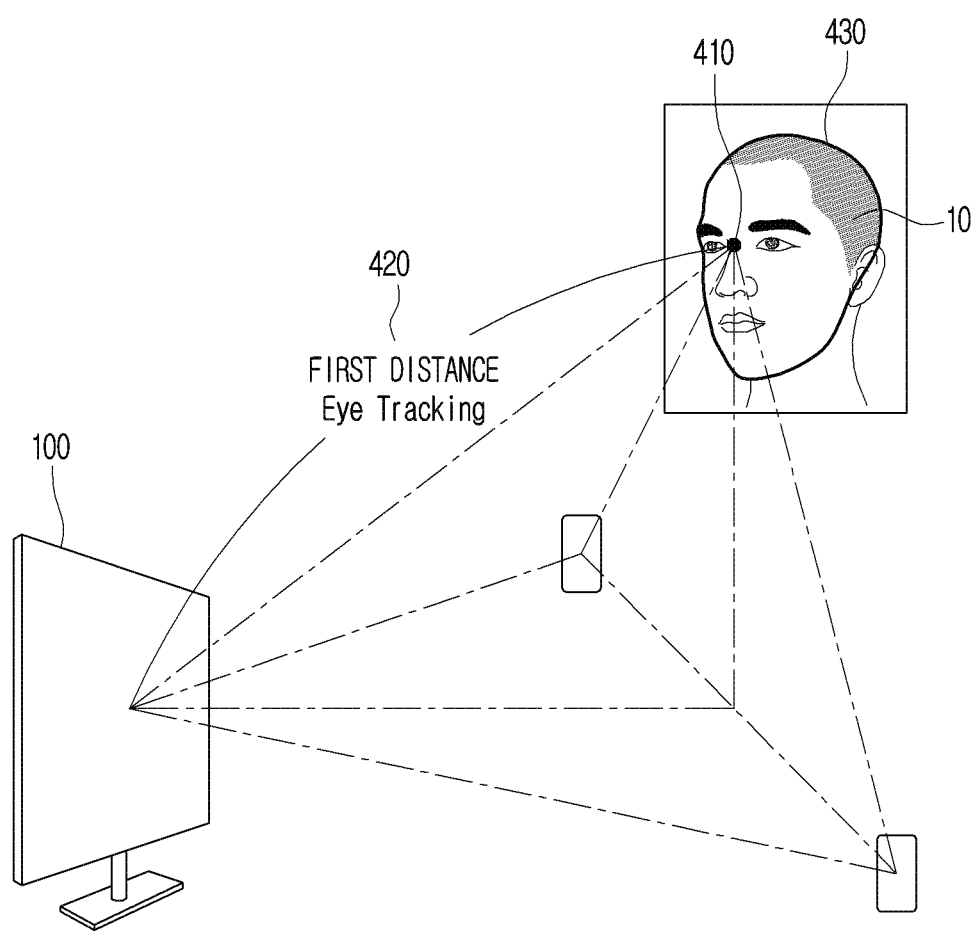
FIG. 4 is a diagram illustrating a process of identifying a position a head and a first distance of a display apparatus according to one or more embodiments.

FIG. 4 is a diagram illustrating a process of identifying a position of a head and a first distance of a display apparatus according to one or more embodiments.

According to one or more embodiments, the display apparatus 100 may identify the position of both eyes of the user 10 based on a captured image of the user (hereinafter, a first captured image) obtained through the depth camera. The display apparatus 100 may obtain the captured image of the user in the initializing process based on the motion guide.

In an example, the display apparatus 100 may identify the position of the eyes of the user from the first captured image captured through the depth camera. The display apparatus 100 may track the movement of the eyes through the camera in real-time, and identify feature points of the eyes such as, for example, and without limitation, a center of the eyes, a position of the pupils, movement of eye lids, and the like. The display apparatus 100 may identify the position of the eyes of the user based on the movement of the eyes and the feature points of the eyes.

According to one or more embodiments, the display apparatus 100 may identify the position of both eyes of the user based on two captured images (hereinafter, a second captured image and a third captured image) obtained through the stereo camera.

According to one or more embodiments, the display apparatus 100 may identify a center position of both eyes as the position of the head based on the positon of both eyes of the user.

Referring to FIG. 4, the display apparatus 100 may identify a position of both eyes of the user 410 based on a captured image obtained through the depth camera or the stereo camera. The display apparatus 100 may identify the identified position of both eyes 410 as a position of a head 430 of the user.

According to one or more embodiments, the display apparatus 100 may identify a distance to the head of the user (hereinafter, a first distance) 420 based on the depth camera or the stereo camera. In an example, the display apparatus 100 may identify the distance to the head 420 by detecting returning light after having been projected at the head 430 of the user through an infrared radiation (IR) signal of the depth camera. For example, the display apparatus 100 may detect, after the IR signal projected from the depth camera arrives at the head of the user, light that is returning after being reflected, and identify the first distance 420 based on time from a projected time-point to a returning time-point.

In an example, the display apparatus 100 may identify the first distance 420 based on a plurality of captured images (hereinafter, a second captured image and a third captured image) obtained through the stereo camera. The stereo camera may include two lenses (a first lens and a second lens), and each of the lenses may be positioned spaced apart by greater than or equal to a baseline distance. Each lens of the stereo camera may be positioned spaced apart by greater than or equal to a focal distance with an image plane on which images of the second captured image and the third captured image captured from each of the lenses are formed. At this time, the second captured image captured by the first lens and the third captured image captured by the second lens may be positioned on the image plane at a back side of the lens. Accordingly, the display apparatus 100 may identify the first distance 420 based on a distance from the second captured image to the third captured image which are positioned on the image plane, the focal distance, and a baseline distance.

Figure 5:
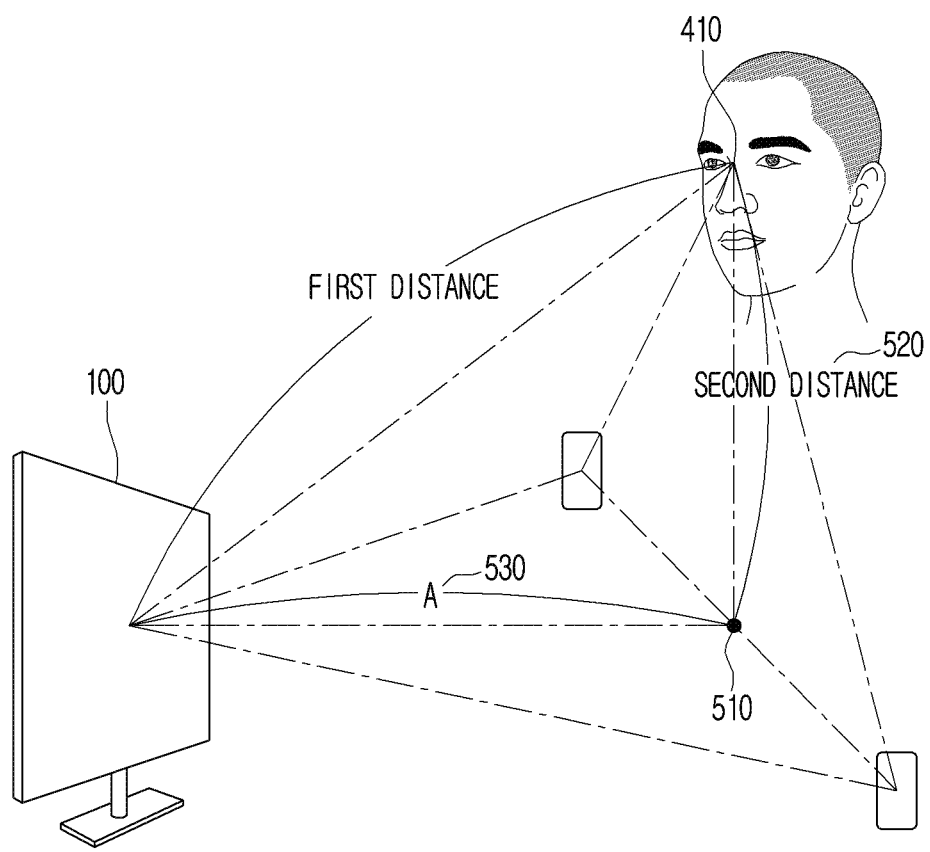
FIG. 5 is a diagram illustrating a process of identifying a pre-set point of a display apparatus according to one or more embodiments.

FIG. 5 is a diagram illustrating a process of identifying a pre-set point of a display apparatus according to one or more embodiments.

According to one or more embodiments, the display apparatus 100 may identify the pre-set point of the spine based on the second distance in a downward direction from the position of the head. For example, the display apparatus 100 may identify the pre-set point of the spine based on the second distance set as 12 cm which is the average value of the length of the neck of the person. Referring to FIG. 5, the display apparatus 100 may identify a pre-set point 510 of the spine spaced apart by 12 cm in the downward direction from the position 410 of the head.

According to one or more embodiments, a linear distance between the pre-set point of the spine and the head of the user may be perpendicular to a linear distance between the pre-set point of the spine and the display apparatus 100.

According to one or more embodiments, the display apparatus 100 may identify a distance (hereinafter, an A distance) 530 from the pre-set point 510 of the spine to the display apparatus 100. The display apparatus 100 may identify the A distance 530 based on an equation of the first distance 420 and a second distance 520.

Referring to FIG. 5, the display apparatus 100 may identify an intersection point at which a line corresponding to the second distance and a line corresponding to the A distance meet as the pre-set point 510 of the spine. Meanwhile, the first line corresponding to the second distance and the second line corresponding to the A distance may be lines that meet perpendicular to each other.

Figure 6:
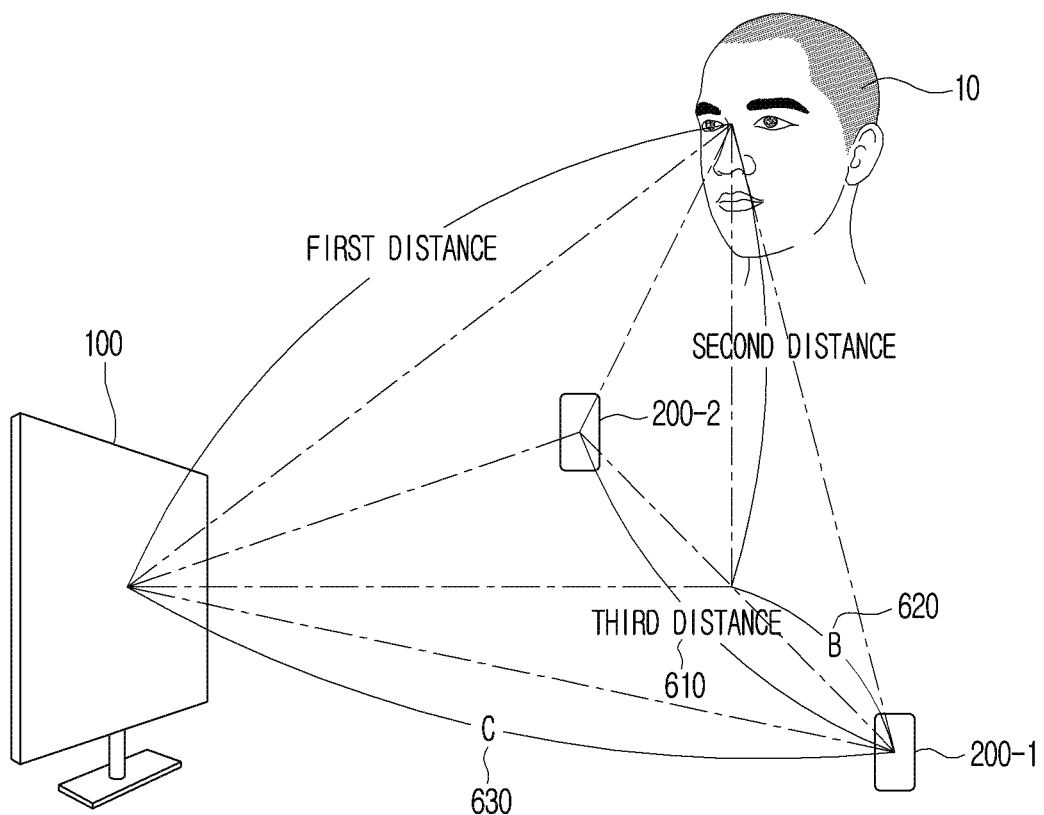
FIG. 6 is a diagram illustrating a process of identifying positions of both hands of a display apparatus according to one or more embodiments.

FIG. 6 is a diagram illustrating a process of identifying positions of both hands of a display apparatus according to one or more embodiments.

According to one or more embodiments, the display apparatus 100 may identify the positon of both hands of the user based on the positions of the motion controllers 200. The display apparatus 100 may perform communication with the plurality of motion controllers 200 gripped by both hands of the user through the communication interface 120. The display apparatus 100 may receive distance information between the motion controllers from at least one from among the plurality of motion controllers 200 through the communication interface 120.

According to an example, the plurality of motion controllers 200 may identify the positions and distances between the motion controllers through an ultra-wideband (UWB) technology. The UWB technology may refer to a communication technology of transmitting data using a wide frequency bandwidth for a very short time. For example, a motion controller 200-1 positioned at a left side of the user may generate a UWB signal for a very short time, and transmit the UWB signal to a motion controller 200-2 positioned at a right side thereof. At this time, a plurality of motion controllers 200-1 and 200-2 may identify a time of arrival of the UWB signal and calculate a distance between the motion controllers 200-1 and 200-2 based therefrom.

According to an example, the plurality of motion controllers 200 may identify the positions and distances between the motion controllers through a laser tracking technology which uses laser rays. For example, the motion controller 200-1 positioned at the left side may irradiate a laser ray to the motion controller 200-2 positioned at the right side, and identify a returning time until the laser ray is reflected and returned through a tracker device. At this time, the motion controller 200-1 may calculate the distance between the motion controllers 200-1 and 200-2 based on the returning time.

Referring to FIG. 6, the display apparatus 100 may receive third distance information 610 between the motion controllers 200-1 and 200-2 from at least one from among the plurality of motion controllers 200-1 and 200-2 through the communication interface 120. The display apparatus 100 may identify distances from the pre-set point 510 of the spine to each of the motion controllers 200-1 and 200-2 based on the received third distance information 610. For example, the display apparatus 100 may identify a B distance 620 from the pre-set point 510 of the spine to the motion controller 200-1 positioned at the left side.

According to one or more embodiments, the display apparatus 100 may identify the distances from the display apparatus 100 to each of the plurality of motion controllers 200-1 and 200-2. For example, the display apparatus 100 may identify a C distance 630 based on an equation of the A distance and the B distance 620.

Figure 7:
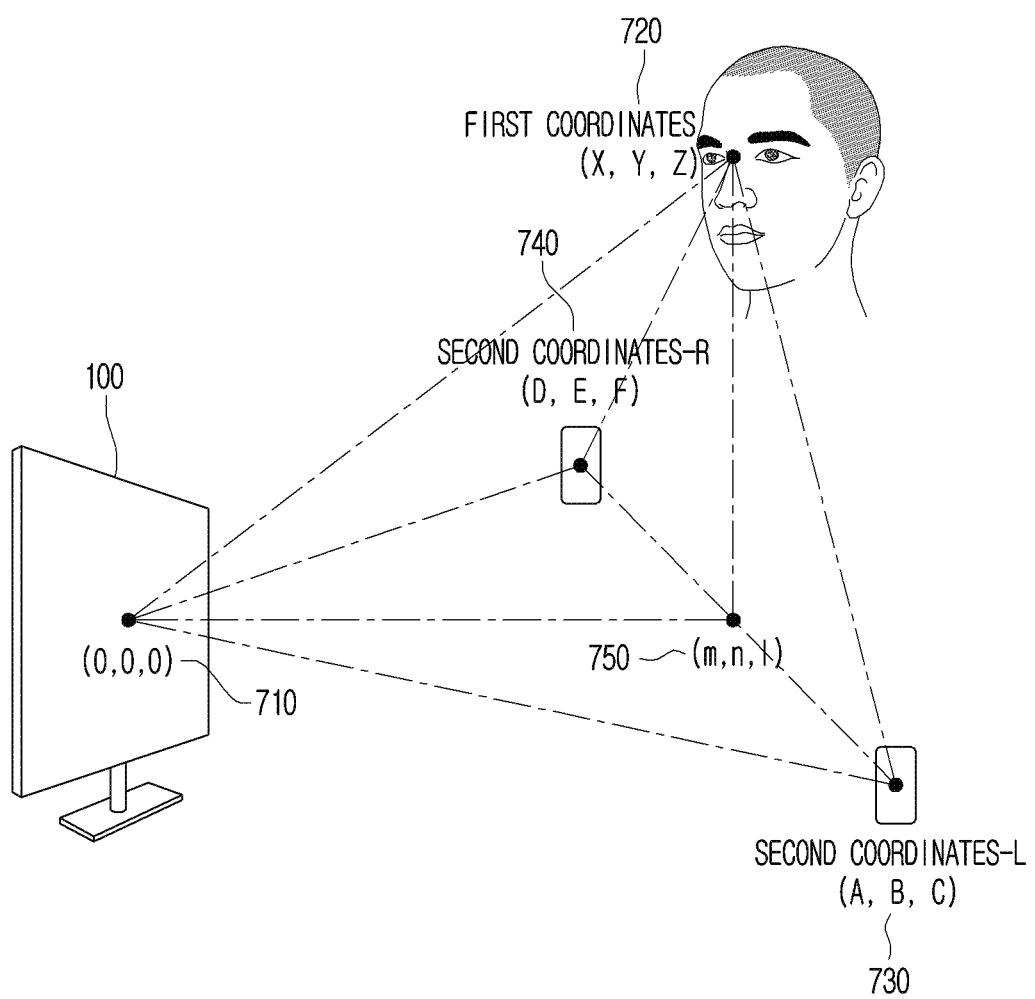
FIG. 7 is a diagram illustrating a process of generating absolute coordinates of a display apparatus according to one or more embodiments.

FIG. 7 is a diagram illustrating a process of generating absolute coordinates of a display apparatus according to one or more embodiments.

According to one or more embodiments, the display apparatus 100 may identify a virtual space (hereinafter, a first virtual space) based on the positon of the head of the user 10 with respect to the display apparatus 100, the first position of both hands of the user, and the position of the display apparatus. The first virtual space may be a space in which the user is positioned in which the positions of the head and both hands of the user are included.

According to one or more embodiments, the display apparatus 100 may identify respective coordinate values corresponding to the positions of the head and both hands of the user 10 using a position of the display apparatus 100 as a reference point in the identified first virtual space. According to an example, the display apparatus 100 may identify first coordinates corresponding to the position of the head of the user. According to an example, the display apparatus 100 may identify second coordinates corresponding to the first position of both hands of the user.

Referring to FIG. 7, the display apparatus 100 may set reference point coordinates (0, 0, 0) using the display apparatus as the reference point. The display apparatus 100 may identify coordinates for the head, coordinates for the pre-set point of the spine and/or coordinates for both hands of the user 10 using the display apparatus as the reference point.

For example, the display apparatus 100 may identify first coordinates (x, y, z) 720 based on the first distance, the second distance and the A distance. For example, the display apparatus 100 may identify coordinates (m, n, 1) 750 of the pre-set point of the spine based on the A distance and the first coordinates 720. For example, the display apparatus 100 may identify second coordinates (a, b, c) 730 of a left hand and second coordinates (d, e, f) 740 of a right hand based on the A distance, the B distance, and the C distance.

According to one or more embodiments, the display apparatus 100 may display representations of both hands of the user by mapping the head of the user 10 and both hands of the user 10 in the content space displayed in the display 110 based on the identified first coordinates 720 and second coordinates 730 and 740. According to an example, the display apparatus 100 may display a 3D stereoscopic image at a position in virtual space corresponding to the first coordinates 720 and/or the second coordinates 730 and 740 by mapping the first coordinates 720 and the second coordinates 730 and 740 to coordinates in virtual space (hereinafter, a second virtual space) corresponding to the VR content image. The display apparatus 100 may map by inputting coordinates in the first virtual space to coordinates in the second virtual space by comparing with the coordinates of the first virtual space with respect to the coordinates of the second virtual space.

According to one or more embodiments, the display apparatus 100 may generate absolute coordinates in a triangle form based on the first coordinates 720 and the second coordinates 730 and 740. The display apparatus 100 may identify, based on motion information of the user 10 being received through the communication interface 120, the changed position of a hand of the user with respect to the absolute coordinates. Here, the absolute coordinates may be fixed coordinates based on the positions of the head and both hands of the user 10 in the first virtual space.

Figure 8:
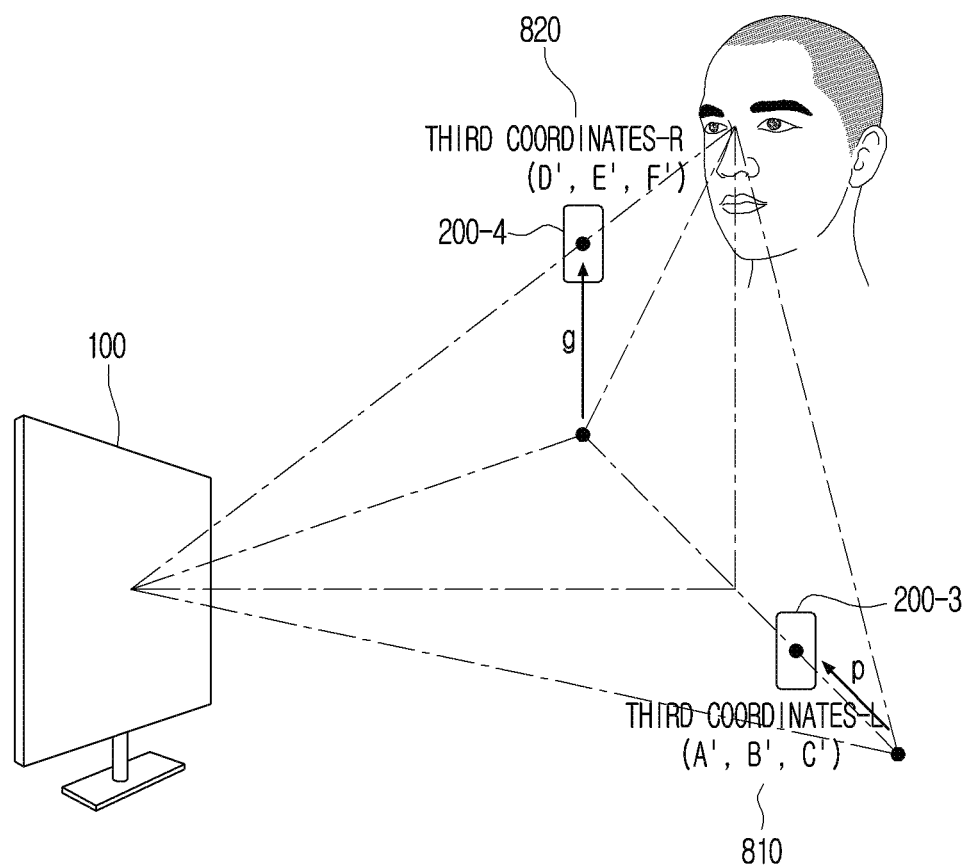
FIG. 8 is a diagram illustrating a process of identifying positions of both hands when motion information is received according to one or more embodiments.

FIG. 8 is a diagram illustrating a process of identifying positions of both hands when motion information is received according to one or more embodiments.

According to one or more embodiments, the display apparatus 100 may identify, based on motion information of both hands of the user being received from the plurality of motion controllers 200, the position (hereinafter, a second position) of both hands based on the received motion information of both hands. The motion information of both hands of the user may refer to movement information which is identified by moving both hands which are gripping the plurality of motion controllers 200 in a upper and lower and/or left and right directions. According to an example, the motion information of both hands of the user may include a moving direction and a moving distance of both hands of the user 10.

According to one or more embodiments, the display apparatus 100 may identify a second position of both hands of the user based on the moving direction and moving distance of both hands of the user received from the plurality of motion controllers 200 through the communication interface 120. According to an example, the display apparatus 100 may identify coordinates (hereinafter, third coordinates) of both hands based on the second position.

According to one or more embodiments, the display apparatus 100 may display representations of both hands of the user 10 based on the identified second position of both hands through the display 110.

Referring to FIG. 8, the display apparatus 100 may receive motion information of both hands of the user from a plurality of motion controllers 200-3 and 200-4. The display apparatus 100 may receive the moving direction and moving distance of both hands of the user from the plurality of motion controllers 200-3 and 200-4. For example, the display apparatus 100 may receive distance information of having moved by p to a right side from a motion controller 200-3 gripped by the left hand of the user. For example, the display apparatus 100 may receive distance information of having moved by q to an upper side from a motion controller 200-4 gripped by the right hand of the user.

The display apparatus 100 may receive motion information including the moving distance and the moving direction from the plurality of motion controllers 200-3 and 200-4, and identify the second position of both hands of the user based on the received information. The display apparatus 100 may identify third coordinates 810 and 820 based on absolute coordinates generated based on the identified second position. For example, the display apparatus 100 may identify coordinates (a', b', c') 810 of the left hand gripping the motion controller 200-3. For example, the display apparatus 100 may identify coordinates (d', e', f') 820 of the right hand gripping the motion controller 200-4.

Figure 9:
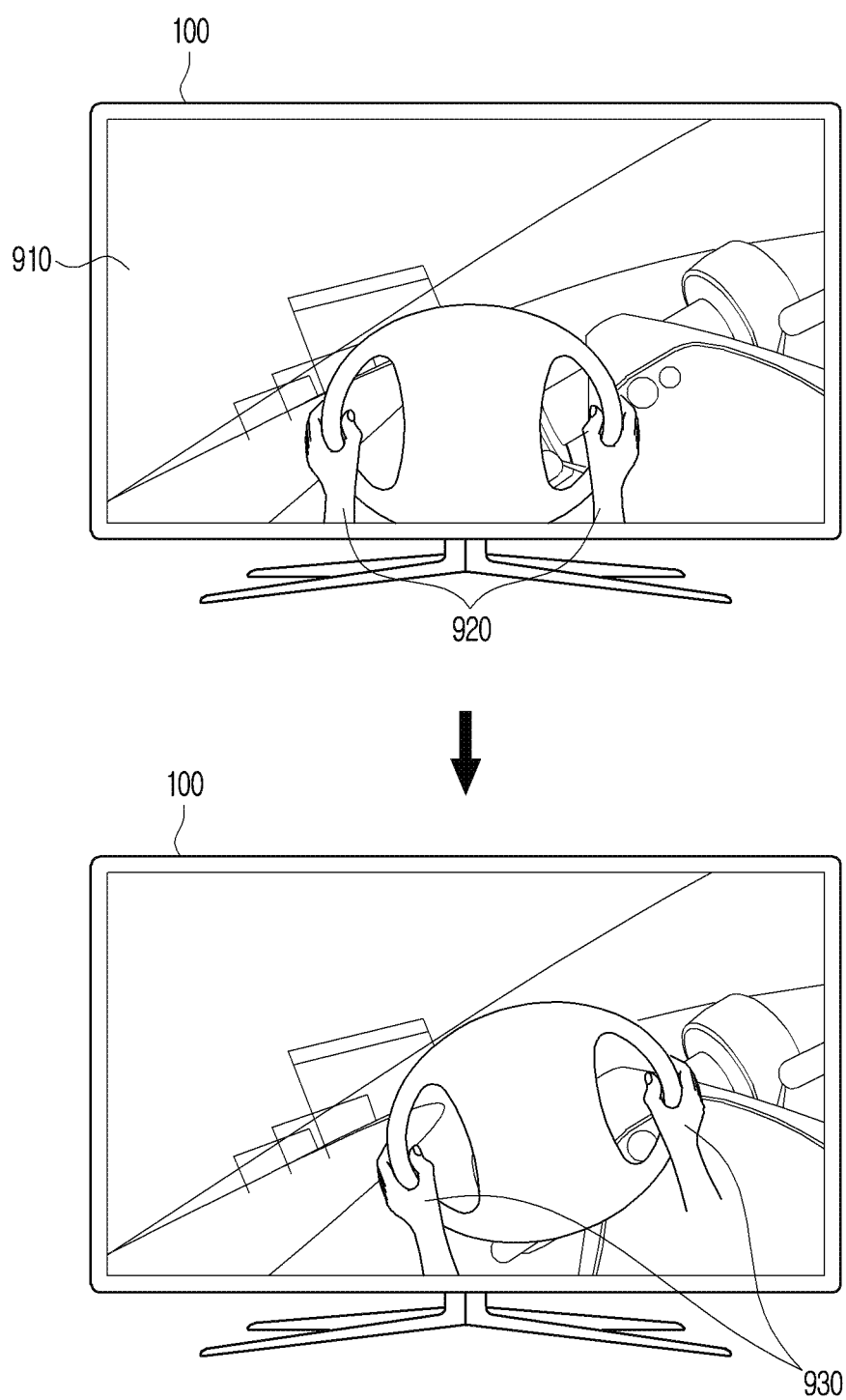
FIG. 9 is a diagram illustrating a process of displaying changed positions of hands based on motion information according to one or more embodiments.

FIG. 9 is a diagram illustrating a process of displaying changed positions of hands based on motion information according to one or more embodiments.

According to one or more embodiments, the display apparatus 100 may display motion information including the changed position of both hands based on the motion information received from the plurality of motion controllers 200 through the display 110.

According to one or more embodiments, the display apparatus 100 may identify coordinates (hereinafter, fourth coordinates) in the second virtual space based on the third coordinates.

According to one or more embodiments, the display apparatus 100 may display representations of both of the hands of the user by mapping coordinates of both hands of the user 10 in the second virtual space displayed in the display 110 based on the identified fourth coordinates. According to an example, the display apparatus 100 may display the 3D stereoscopic image at a position corresponding to the third coordinates 810 and 820 by mapping the third coordinates 810 and 820 at coordinates in the second virtual space corresponding to the VR content image.

Referring to FIG. 9, the display apparatus 100 may display the 3D stereoscopic image at a position 920 in a second virtual space 910 corresponding to the second coordinates 730 and 740 by mapping the second coordinates 730 and 740 of the first virtual space at coordinates in the second virtual space. The display apparatus 100 may display the 3D stereoscopic image at a position 930 in the second virtual space 910 corresponding to the third coordinates 810 and 820 by mapping the third coordinates 810 and 820 at the fourth coordinates in the second virtual space 910 based on the received motion information.

For example, the display apparatus 100 may map the third coordinates 810 and 820 at the fourth coordinates in the second virtual space based on motion information of the left hand moving to the right side based on the user, and the right hand moving to the upper side based on the user received through the communication interface 120.

Figure 10:
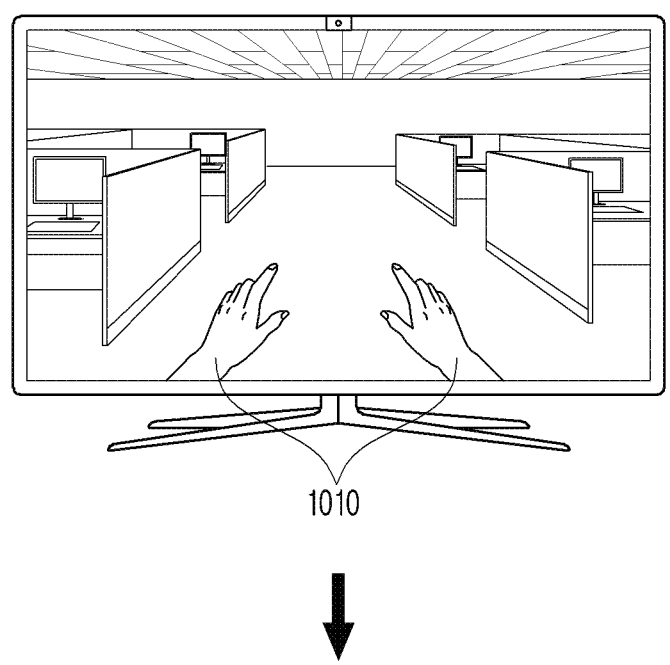
FIG. 10 is a diagram illustrating a process of adjusting sizes of both hands of a user according to one or more embodiments.
Figure 10:
Figure 10:
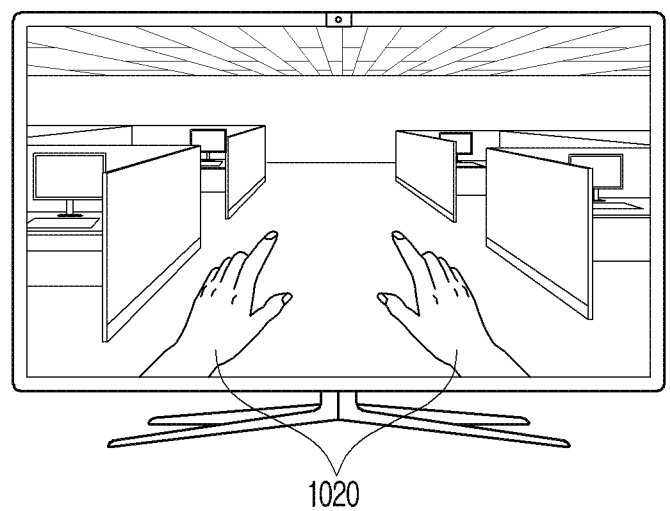

FIG. 10 is a diagram illustrating a process of adjusting sizes of both hands of a user according to one or more embodiments.

According to one or more embodiments, the display apparatus 100 may adjust a size of both hands of the user 10 displayed through the display 110 by adjusting the pre-set second distance. For example, the display apparatus 100 may increase the size of the hands of the user 10 by a ratio in which the second distance is increased based on the increased second distance.

According to one or more embodiments, the display apparatus 100 may adjust the second distance and/or the size of both hands of the user based on a VR content type. For example, the display apparatus 100 may adjust the second distance and/or the size of both hands of the user based on a VR content image that includes a character having large hands or body.

Referring to FIG. 10, the display apparatus 100 may adjust the size of the hands of the user 10 by a ratio by which the second distance is increased or decreased based on the second distance according to the user input. For example, the display apparatus 100 may display a 3D image 1010 of both hands of the user based on the pre-set second distance. The display apparatus 100 may display, based on increasing the pre-set second distance according to the user input, a 3D image 1020 in which the size of both hands of the user is increased by an increase ratio of the second distance.

According to an example, the display apparatus 100 may adjust, based on the VR content image being changed from a normal character mode to a giant character or an animal character mode, the second distance and the size of both hands of the user based on the changed character mode.

Figure 11:
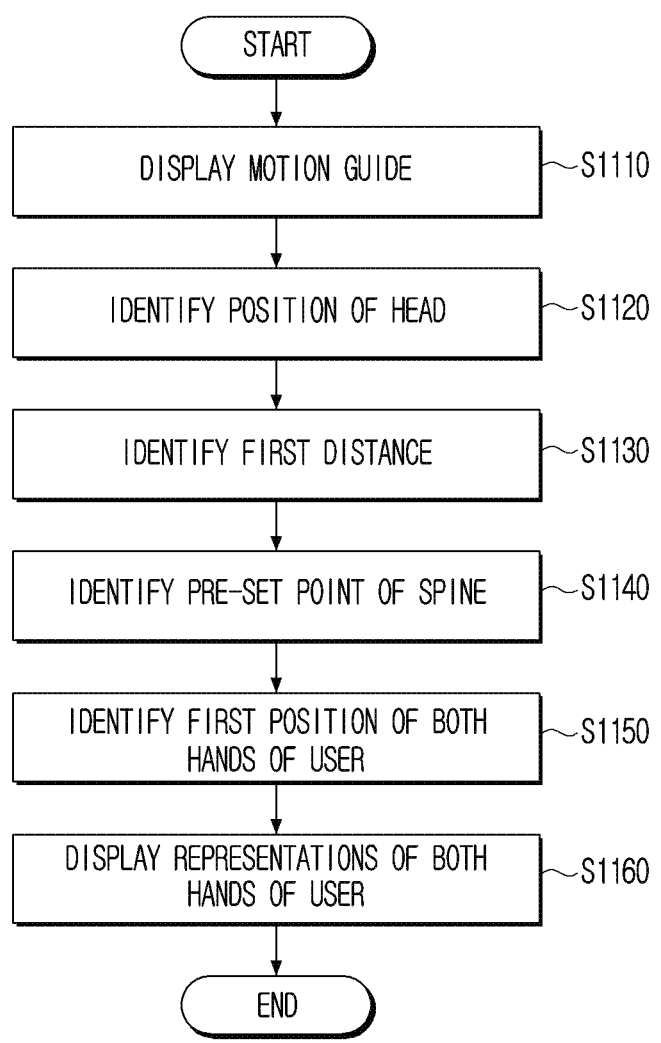
FIG. 11 is a diagram illustrating a controlling method of a display apparatus according to one or more embodiments.

FIG. 11 is a diagram illustrating a controlling method of a display apparatus according to one or more embodiments.

Referring to FIG. 11, in operation 1110, the display apparatus 100 may display the motion guide including the pre-set pose.

In operation 1120, the display apparatus 100 may identify the position of the head of the user based on the captured image of the user.

In operation 1130, the display apparatus 100 may identify the first distance from the display apparatus 100 to the position of the head.

In operation 1140, the display apparatus 100 may identify the pre-set point of the spine based on the pre-set second distance in the downward direction from the position of the head.

In operation 1150, the display apparatus 100 may identify the first position of both hands of the user corresponding to the pre-set pose based on distance information from at least one from among the plurality of motion controllers gripped by both hands of the user.

In operation 1160, the display apparatus 100 may display representations of both hands of the user based on the first position of both hands of the user.

For implementation details of identifying the position of the head of the user, the pre-set point of the spine, and the first position of both hands in the descriptions below, reference may be made to the various embodiments described above.

The controlling method described in FIG. 11 may be performed by the display apparatus 100 having the configuration of FIG. 2, but is not necessarily limited thereto, and may be performed by a display apparatus having various configurations.

The various embodiments described above may be implemented in a singular embodiment, and at least one of the embodiments may be implemented together with one device by being combined in its entirety or partially with one another.

According to the various embodiments described above, absolute coordinates may be generated based on the position of the head and the position of both hands of the user, and motion information which is changed in real-time by the user based on the absolute coordinates may be identified.

Meanwhile, the various embodiments described above may be applied in a product in a singular embodiment, but may be implemented together with at least a portion of content being combined with another embodiment of the disclosure.

The various embodiments described above may be implemented with software including instructions stored in a machine-readable storage media (e.g., computer). The machine may call a stored instruction from the storage medium, and as an apparatus operable according to the called instruction, may include an electronic apparatus (e.g., display apparatus 100) according to the above-mentioned embodiments. Based on a command being executed by the processor, the processor may directly or using other elements under the control of the processor perform a function relevant to the command. The command may include a code generated by a compiler or executed by an interpreter. The machine-readable storage medium may be provided in a form of the non-transitory computer-readable storage medium. Herein, 'non-transitory' merely means that the storage medium is tangible and does not include a signal, and the term does not differentiate data being semi-permanently stored or being temporarily stored in the storage medium.

In addition, according to one or more embodiments, a method according to the various embodiments described above may be provided included a computer program product.

A non-transitory computer-readable storage medium or a computer program product storing computer instructions to perform operations including displaying the motion guide including the pre-set pose, identifying the position of the head of the user based on the captured image of the user, identifying the first distance from the display apparatus to the position of the head, identifying the pre-set point of the spine based on the pre-set second distance in the downward direction from the position of the head, identifying the first position of both hands of the user corresponding to the pre-set pose based on the distance information from at least one from among the plurality of motion controllers gripped by both hands of the user, and displaying the representations of both hands of the user based on the first position of both hands of the user may be provided.

The computer program product may be distributed in a form of a machine-readable storage medium (e.g., a compact disc read only memory (CD-ROM)), or distributed online through an application store (e.g., PLAYSTORE™). In the case of online distribution, at least a portion of the computer program product may be stored at least temporarily in the storage medium such as a server of a manufacturer, a server of an application store, or a memory of a relay server, or temporarily generated.

In addition, the computer instructions or program for performing the controlling method of the display apparatus and the like according to the various embodiments described above may be stored in a non-transitory computer-readable medium. The computer instructions stored in this non-transitory computer-readable medium may cause a device to perform the processing operations in the device according to the above-described various embodiments when executed by a processor of the device. The non-transitory computer-readable medium may refer to a medium that stores data semi-permanently rather than storing data for a very short time, such as a register, a cache, a memory, or the like, and is readable by a device. Examples of the non-transitory computer-readable medium may include, for example, and without limitation, a compact disc (CD), a digital versatile disc (DVD), a hard disc, a Blu-ray disc, a USB, a memory card, a ROM, and the like.

While the disclosure has been illustrated and described with reference to example embodiments thereof, it will be understood that the example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. A display apparatus, comprising:
a display;
a communication interface;
at least one camera;
one or more processors; and
memory storing instructions that, when executed by the one or more processors, cause the display apparatus to:
display a motion guide comprising a pre-set pose through the display;
identify a position of a head of a user based on an image obtained through the at least one camera;
identify a first distance from the display apparatus to the position of the head;
identify a pre-set point of a spine based on a pre-set second distance in a downward direction from the position of the head;
identify a first position of both hands of the user corresponding to the pre-set pose based on distance information from at least one from among a plurality of motion controllers gripped by both of the hands through the communication interface; and
display, through the display, representations of both of the hands based on the first position.

2. The display apparatus of claim 1, wherein the one or more processors are configured to execute the instructions to cause the display apparatus to:
identify, based on motion information of both of the hands being received from the plurality of motion controllers, a second position of both of the hands based on the motion information; and
display, through the display, the representations of both of the hands based on the second position of both of the hands.

3. The display apparatus of claim 2, wherein the motion information comprises a moving direction and a moving distance of both of the hands, and
wherein the one or more processors are configured to execute the instructions to cause the display apparatus to identify the second position of both of the hands based on the moving direction and the moving distance of both of the hands.

4. The display apparatus of claim 1,
wherein the one or more processors are configured to execute the instructions to cause the display apparatus to:
identify a first virtual space based on the position of the head, the first position of both of the hands, and a position of the display apparatus;
identify first coordinates corresponding to the position of the head and second coordinates corresponding to the first position of both of the hands based on the position of the display apparatus as a reference point in the first virtual space; and
display the representations of both of the hands by mapping the head and both of the hands in a content space displayed in the display based on the first coordinates and the second coordinates.

5. The display apparatus of claim 4, wherein the content space is a second virtual space corresponding to a virtual reality (VR) content image, and
wherein the one or more processors are configured to execute the instructions to cause the display apparatus to:
identify, based on third coordinates corresponding to a second position of both of the hands in the first virtual space being identified, fourth coordinates in the second virtual space based on the third coordinates; and
display the representations of both of the hands by mapping both of the hands in the content space based on the fourth coordinates.

6. The display apparatus of claim 1, wherein the one or more processors are configured to execute the instructions to cause the display apparatus to:
identify a position of both eyes of the user based on a first captured image obtained through a depth camera or identify the position of both of the eyes based on a second captured image and a third captured image obtained through a stereo camera; and
identify the position of the head based on a center position of both of the eyes.

7. The display apparatus of claim 1, wherein the pre-set pose is a pose in which both of the hands are positioned at a horizontal line comprising the pre-set point of the spine and face a front side of the display, and
wherein a first linear distance between the pre-set point and the head is perpendicular to a second linear distance between the pre-set point and the display.

8. The display apparatus of claim 7, wherein the display is a light field display (LFD) providing a 3D image.

9. The display apparatus of claim 1, wherein the one or more processors are configured to execute the instructions to cause the display apparatus to adjust sizes of the representations of both of the hands by adjusting the pre-set second distance.

10. The display apparatus of claim 1, wherein the one or more processors are configured to execute the instructions to cause the display apparatus to adjust a size of the representations of both of the hands based on a VR content type.

11. A controlling method of a display apparatus, comprising:
    displaying a motion guide comprising a pre-set pose;
    identifying a position of a head of a user based on a captured image of the user;
    identifying a first distance from the display apparatus to the position of the head;
    identifying a pre-set point of a spine based on a pre-set second distance in a downward direction from the position of the head;
    identifying a first position of both hands of the user corresponding to the pre-set pose based on distance information from at least one from among a plurality of motion controllers gripped by both of the hands; and
    displaying representations of both of the hands based on the first position of both hands of the user.

12. The controlling method of claim 11, further comprising:
    identifying, based on motion information of both of the hands being received from the plurality of motion controllers, a second position of both of the hands based on the motion information; and
    displaying the representations of both of the hands based on the second position of both of the hands.

13. The controlling method of claim 12, wherein the motion information comprises a moving direction and a moving distance of both of the hands, and
    wherein the identifying the second position comprises identifying the second position of both of the hands based on the moving direction and the moving distance of both of the hands.

14. The controlling method of claim 11, wherein the displaying the representations of both of the hands, comprises:
    identifying a first virtual space based on the position of the head, the first position of both of the hands, and a position of the display apparatus;
    identifying first coordinates corresponding to the position of the head and second coordinates corresponding to the first position of both of the hands based on the position of the display apparatus as a reference point in the first virtual space; and
    displaying the representations of both of the hands by mapping the head and both hands in a content space based on the first coordinates and the second coordinates.

15. The controlling method of claim 14, wherein the content space is a second virtual space corresponding to a virtual reality (VR) content image, and
    wherein the displaying the representations of both of the hands, further comprises:
        identifying, based on third coordinates corresponding to a second position of both of the hands in the first virtual space being identified, fourth coordinates in the second virtual space based on the third coordinates; and
        displaying the representations of both of the hands by mapping both of the hands in the content space based on the fourth coordinates.

16. The controlling method of claim 11, wherein the identifying the position of the head comprises:
    identifying a position of both eyes of the user based on a first captured image obtained through a depth camera or identifying the position of both of the eyes based on a second captured image and a third captured image obtained through a stereo camera; and
    identifying the position of the head based on a center position of both of the eyes.

17. The controlling method of claim 11, wherein the pre-set pose is a pose in which both of the hands are positioned at a horizontal line comprising the pre-set point of the spine and face a front side of the display, and
    wherein a first linear distance between the pre-set point and the head is perpendicular to a second linear distance between the pre-set point and the display.

18. The controlling method of claim 17, wherein the representations of both of the hands are displayed via a light field display (LFD) providing a 3D image.

19. The controlling method of claim 11, further comprising adjusting sizes of the representations of both of the hands by adjusting the pre-set second distance.

20. A non-transitory computer-readable storage medium storing computer instructions for a display apparatus to perform an operation when executed by a processor of the display apparatus, the operation comprising:
    displaying a motion guide comprising a pre-set pose;
    identifying a position of a head of a user based on a captured image of the user;
    identifying a first distance from the display apparatus to the position of the head;
    identifying a pre-set point of a spine based on a pre-set second distance in a downward direction from the position of the head;
    identifying a first position of both hands of the user corresponding to the pre-set pose based on distance information from at least one from among a plurality of motion controllers gripped by both of the hands; and
    displaying representations of both of the hands based on the first position.

* * * * *